(12) United States Patent
Boyer

(10) Patent No.: US 9,776,530 B2
(45) Date of Patent: Oct. 3, 2017

(54) VEHICLE SEAT SUSPENSION MAT

(71) Applicant: IEE INTERNATIONAL ELECTRONICS & ENGINEERING S.A., Echternach (LU)

(72) Inventor: Philippe Boyer, Boust (FR)

(73) Assignee: IEE International Electronics & Engineering S.A., Echternach (LU)

( * ) Notice: Subject to any disclaimer, the term of this patent is extended or adjusted under 35 U.S.C. 154(b) by 21 days.

(21) Appl. No.: 14/404,272

(22) PCT Filed: May 17, 2013

(86) PCT No.: PCT/EP2013/060225
§ 371 (c)(1),
(2) Date: Nov. 26, 2014

(87) PCT Pub. No.: WO2013/178486
PCT Pub. Date: Dec. 5, 2013

(65) Prior Publication Data
US 2015/0137568 A1    May 21, 2015

(30) Foreign Application Priority Data
May 30, 2012 (LU) .......................... 92011

(51) Int. Cl.
*B60N 2/00* (2006.01)
*B60N 2/70* (2006.01)
(Continued)

(52) U.S. Cl.
CPC ............... *B60N 2/002* (2013.01); *B60N 2/54* (2013.01); *B60N 2/7094* (2013.01);
(Continued)

(58) Field of Classification Search
CPC ........ B60R 21/01516; B60R 21/01524; B60N 2/002; B60N 2/54; B60N 2/7094;
(Continued)

(56) References Cited

U.S. PATENT DOCUMENTS

| 4,869,554 A | 9/1989 | Abu-Isa |
|---|---|---|
| 5,013,089 A | 5/1991 | Abu-Isa et al. |

(Continued)

FOREIGN PATENT DOCUMENTS

| DE | 4212018 A1 | 10/1992 | |
|---|---|---|---|
| DE | 19600346 A1 * | 7/1997 | ............. B60N 2/002 |

(Continued)

OTHER PUBLICATIONS

International Search Report and Written Opinion issued Sep. 19, 2013 re: PCT/EP2013/060225; citing: EP 2 450 228 A2, JP 49 132105 U, EP 2 450 229 A2 and EP 1 666 311 B1.

(Continued)

*Primary Examiner* — Milton Nelson, Jr.
(74) *Attorney, Agent, or Firm* — Reising Ethington P.C.

(57) ABSTRACT

A suspension mat (14) for a vehicle seat comprises one or more suspension springs (16) for supporting a cushion (28), a support plate (18) attached to the one or more suspension springs, a mobile plate (34) coupled with the support plate, a flat spring (26) arranged between the support plate and the mobile plate and a switch element. The mobile plate is arranged movable between a first and a second position relative to the support plate. The flat spring biases the mobile plate toward the first position. The switch element is located between the support plate and the flat spring, in such a way that when the mobile plate moves against a bias of the flat spring toward the second position, the flat spring presses and actuates the switch element. The flat spring may e.g. com- (Continued)

prise a washer spring, a plate spring, a dome-shaped flat spring and/or a cantilever flat spring.

12 Claims, 2 Drawing Sheets

(51) Int. Cl.
- *B60N 2/54* (2006.01)
- *H01H 13/702* (2006.01)
- *G01L 1/22* (2006.01)
- *B60R 21/015* (2006.01)

(52) U.S. Cl.
 CPC .. *B60R 21/01516* (2014.10); *B60R 21/01524* (2014.10); *G01L 1/22* (2013.01); *H01H 13/702* (2013.01); *H01H 2203/038* (2013.01); *H01H 2205/028* (2013.01); *H01H 2215/004* (2013.01)

(58) Field of Classification Search
 CPC .. G01L 1/22; H01H 13/702; H01H 2205/028; H01H 2215/004; H01H 2203/038
 USPC ............................................ 297/217.2, 217.3
 See application file for complete search history.

(56) References Cited

U.S. PATENT DOCUMENTS

| | | |
|---|---|---|
| 5,439,271 A | 8/1995 | Ryan |
| 5,884,977 A | 3/1999 | Swamy et al. |
| 5,984,349 A | 11/1999 | Van Voorhies |
| 6,056,079 A | 5/2000 | Cech et al. |
| 6,070,942 A | 6/2000 | Barton et al. |
| 6,213,557 B1 | 4/2001 | Aebischer et al. |
| 6,419,313 B1 | 7/2002 | Newman |
| 6,719,368 B1 | 4/2004 | Neale |
| 7,618,096 B2 | 11/2009 | Fujita et al. |
| 8,328,276 B2 | 12/2012 | Inayoshi et al. |
| 8,973,989 B2 | 3/2015 | Oman et al. |
| 2002/0062998 A1 | 5/2002 | Curtis |
| 2003/0033885 A1 | 2/2003 | Knox et al. |
| 2003/0047974 A1 | 3/2003 | Tame |
| 2004/0108755 A1 | 6/2004 | Neale |
| 2004/0124018 A1 | 7/2004 | Yanagi |
| 2004/0262049 A1 | 12/2004 | Senoh et al. |
| 2005/0168046 A1 | 8/2005 | Hadi et al. |
| 2005/0253442 A1 | 11/2005 | Huse |
| 2008/0164732 A1 | 7/2008 | Valasin et al. |
| 2008/0191527 A1 | 8/2008 | Takai et al. |
| 2009/0051198 A1 | 2/2009 | Ishikawa et al. |
| 2010/0207431 A1 | 8/2010 | Petzel et al. |
| 2010/0244504 A1 | 9/2010 | Colja et al. |
| 2010/0295563 A1 | 11/2010 | Bieck et al. |
| 2011/0248534 A1 | 10/2011 | Pinto et al. |
| 2012/0234620 A1* | 9/2012 | Boyarski ................ B60K 28/04 180/273 |
| 2012/0299605 A1 | 11/2012 | Wakabayashi et al. |
| 2013/0313876 A1 | 11/2013 | Perrin |
| 2014/0246887 A1 | 9/2014 | Clos et al. |
| 2015/0008709 A1 | 1/2015 | Erhel |
| 2015/0123436 A1 | 5/2015 | Boyer et al. |
| 2015/0137569 A1 | 5/2015 | Goedert |
| 2015/0143927 A1 | 5/2015 | Goedert et al. |

FOREIGN PATENT DOCUMENTS

| | | |
|---|---|---|
| EP | 1666311 B1 | 1/2009 |
| EP | 2450228 A2 | 5/2012 |
| EP | 2450229 A2 | 5/2012 |
| FR | 2937291 A1 | 4/2010 |
| JP | 49132105 U | 11/1974 |
| WO | 2004089687 A1 | 10/2004 |
| WO | 2012053619 A1 | 4/2012 |

OTHER PUBLICATIONS

International Search Report and Written Opinion issued Sep. 5, 2013 re: PCT/EP2013/060221; citing: WO 2004/089687 A1, DE 101 45 370 A1 and DE 42 12 018 A1.

International Search Report and Written Opinion issued Sep. 5, 2013; re: PCT/EP2013/060227; citing: WO 2012/053619 A1, EP 2 450 228 A2 and FR 2 937 291 A1.

* cited by examiner

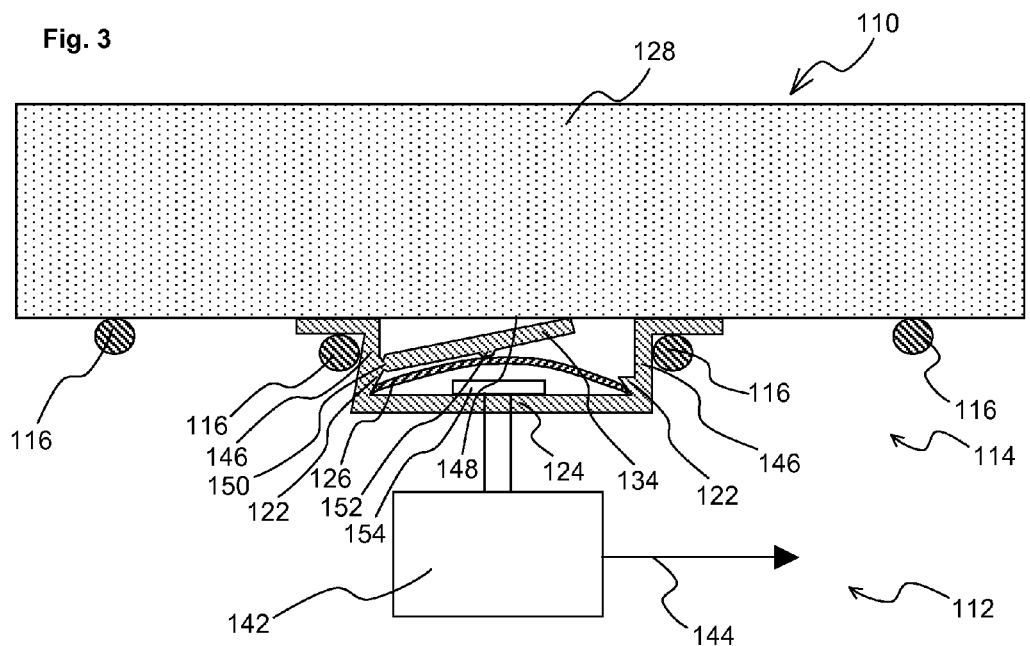
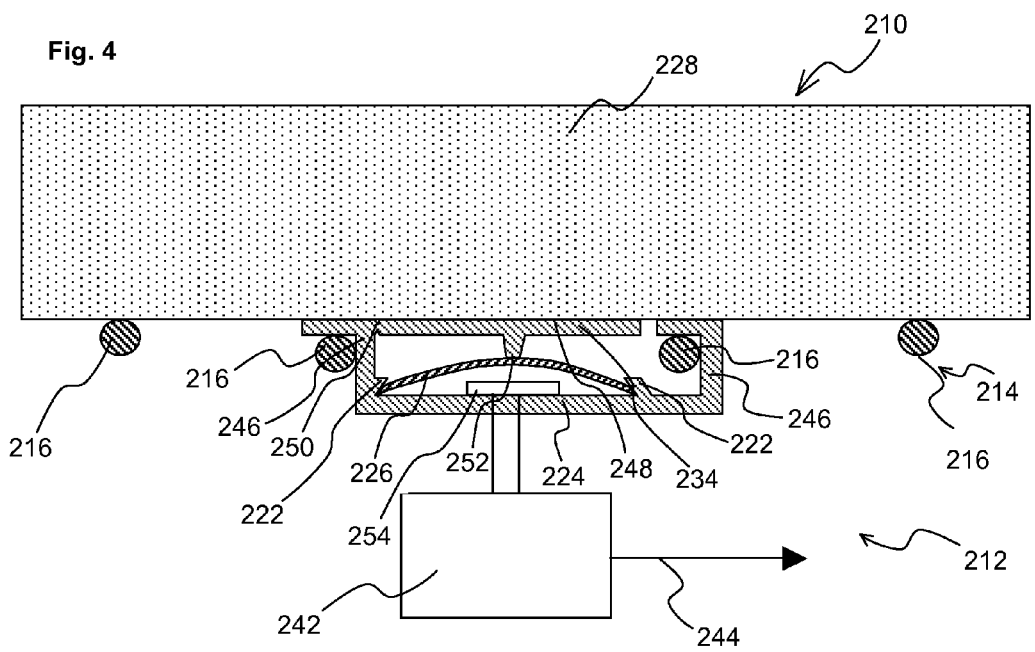

VEHICLE SEAT SUSPENSION MAT

TECHNICAL FIELD

The present invention generally relates to the field of vehicle seats. In particular, the invention relates to a suspension mat for a vehicle seat.

BACKGROUND ART

Seat occupancy sensors are nowadays widely used in automotive vehicles to provide a seat occupancy signal for various appliances, such as, e.g. a seat belt reminder, an auxiliary restraint system (airbag), etc. The possibility of customization and personalization of the vehicle by the customer is a key selling factor of modern cars. This leads to many different variants of car interiors being offered for one car model. With the increasing number of available options, severe constraints arise concerning the implementation of technical equipment in the vehicle. With seat occupancy sensors arranged between the foam body of the seat cushion and the seat cover, every seat design (leather, cloth, sport, comfort, . . . ) requires specific development effort for the occupant detection system. That induces high development costs and therefore is an unattractive solution for the automotive industry. A problem to be solved is, therefore, to find a sensor solution, which is less influenced by seat design and thus can be used for a greater variety of car seats or even car platforms.

Document EP 1 666 311 B1 discloses a vehicle seat assembly comprising a seat support pan, a seat cushion, a spring biased lever and an operator present switch. Both the lever and the switch are located between the cushion and the pan, effectively integrated within the seat. The lever is movable between upper and lower positions, with its associated spring biasing the lever toward its upper position. The switch is designed and located so that all of its components are housed within the support pan and none of these components extends below or outside of the pan. When the seat is occupied, the occupant's weight depresses the cushion and, in turn, the lever moves against the force of the spring toward its lower position and the switch is actuated.

A drawback of the vehicle seat assembly of document EP 1 666 331 resides in the fact that it requires the presence of a seat pan. For comfort reasons, however, modern seats often comprise a suspension mat, instead of a seat pan, to support the seat cushion.

BRIEF SUMMARY

The present invention overcomes or at least reduces the drawbacks of the prior art.

According to the invention, a suspension mat for a vehicle seat comprises one or more suspension springs for supporting a cushion, a support plate attached to at least one of the one or more suspension springs, a mobile plate coupled with the support plate, a flat spring arranged between the support plate and the mobile plate and a switch element. The mobile plate is arranged so as to be movable between a first position and a second position with respect to the support plate. The flat spring biases the mobile plate toward the first position. The switch element is located between the support plate and the flat spring, in such a way that when the mobile plate moves against a bias of the flat spring toward the second position, the flat spring presses and actuates the switch element.

As those skilled will appreciate, when an occupant sits down on a vehicle seat equipped with a suspension mat according to the invention and a cushion arranged on the suspension mat, the cushion push the mobile plate into the second position. As a result, the flat spring actuates the switch element. The mechanical parameters of the spring and the other components of the suspension mat can be adjusted in such a ways as to achieve a desired threshold force for the activation of the switch element. For instance, the seat suspension mat may be configured such that the switch element is actuated only when only when a 5th-percentile female or heavier occupant is seated on the vehicle seat. The switch element will be not actuated when the weight of any object or occupant on the seat is below the threshold force. It follows that lighter occupants (e.g. a child in a child seat) or objects (e.g. a handbag, a laptop computer etc.) can be distinguished from heavier ones. The threshold force is preferably set in accordance with the intended application of the vehicle seat suspension mat, e.g. in the context of a seat belt reminder system and/or an airbag control system. An aspect of the present invention thus concerns a seat occupancy sensing system comprising a seat suspension mat as described herein.

Within the context of the present document, the term "flat spring" is intended to encompass a flat spring as such, a plate spring, a dome-shaped flat spring, a diaphragm spring, a leaf spring, a washer spring, a cantilever flat spring and variations of such springs.

The suspension mat is preferably configured in such a way so as to have no negative impact on the occupant's seating comfort and not to influence (shift) the H-point of the car. The actuate plate is advantageously located below the H-point and vertically aligned with the H-point.

Advantageously, the mobile plate and the support plate are made of one piece. The mobile plate can be coupled to the support plate by a prismatic joint or by a hinge joint, preferably as a film hinge joint.

The switch element can comprise a pressure-responsive switch (such as, e.g., a membrane switch) or a printed circuit. The flat spring is electrically conductive if it serves as a contact element of the switch element. The flat spring can be made of conductive metal, preferably of steel. According to a preferred embodiment, the printed circuit comprises a first track in electrical contact with the flat spring, and a second track spaced from the first track and placed in such a way the first track and the second track are put in electrical contact with each other via the flat spring when the flat spring actuates the switch element.

Preferably, the mobile plate comprises a protrusion facing the flat spring so as to concentrate a force exerted by the mobile plate on a point of the flat spring.

Advantageously, the flat spring is held jammed and in tension by abutments provided on or in the support plate. The flat spring can comprise at least one of a washer spring, a plate spring, a dome-shaped flat spring and a cantilever flat spring.

An aspect of the invention concerns a vehicle seat that comprises a structural frame comprising at least two fixation sites, a suspension mat as described herein, wherein taut between the fixation sites, and a cushion arranged on the suspension mat. The mobile plate is movable between an upper and a lower position in cooperation with the cushion. Optionally, the support plate is arranged in a recess of the cushion.

BRIEF DESCRIPTION OF THE DRAWINGS

Preferred embodiments of the invention will now be described, by way of example, with reference to the accompanying drawings, in which:

FIG. 3 is a schematic cross sectional view of a vehicle seat comprising a seat suspension mat according to a second preferred embodiment of the invention;

FIG. 4 is a schematic cross sectional view of a vehicle seat comprising a seat suspension mat according to a third preferred embodiment of the invention.

DESCRIPTION OF PREFERRED EMBODIMENTS

Figure 1:
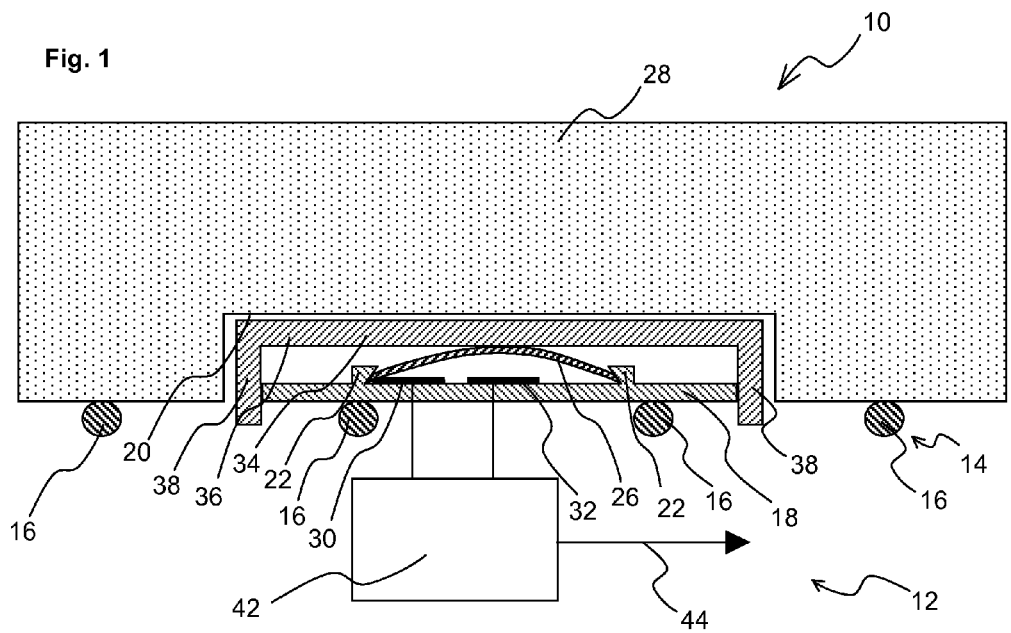
FIG. 1 is a schematic cross sectional view of a vehicle seat comprising a seat suspension mat according to a first preferred embodiment of the invention in unloaded condition (empty seat)
Figure 2:
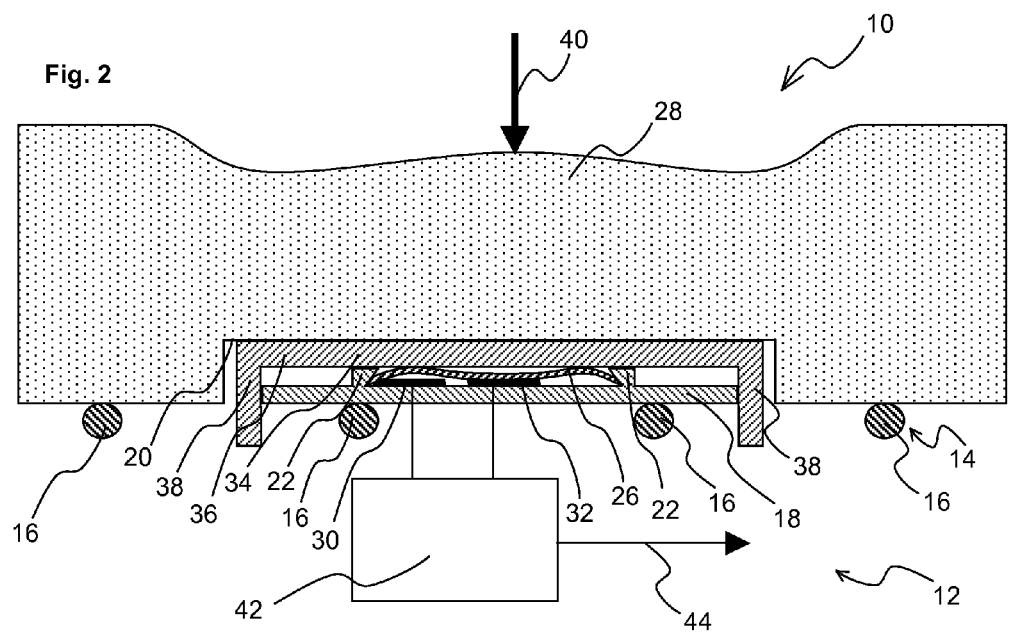
FIG. 2 is a schematic cross sectional view of the vehicle seat of FIG. 1 in loaded condition (an occupant is seated on the seat)

A vehicle seat 10, comprising a vehicle seat suspension mat 14 according to a first preferred embodiment of the invention, is shown in FIGS. 1 and 2. The suspension mat 14 is equipped with an integrated occupancy detector 12. The suspension mat 14 comprises a plurality of suspension springs 16 taut between fixation sites of a structural frame (not shown) of the vehicle seat 10.

The occupancy detector 12 comprises a support plate 18 attached to at least one suspension spring 16 of the suspension mat 14. The support plate 18 is preferably carried out as a cross-tie between at least two of the suspension springs 16. The occupancy detector 12 further comprises a mobile plate 34 coupled with the support plate 18 in the manner of a prismatic joint, which allows the mobile plate 34 to move between a first position, spaced from the support plate 18, and a second position, which is closer to the support plate 18. A flat spring 26 biases the mobile plate 34 towards the first position (FIG. 1). The flat spring 26 is held jammed and in tension by protrusions of the support plate 18, which serve as abutments 22 for the flat spring 26.

A cushion 28 is arranged on the suspension mat 14. In the illustrated embodiment, the cushion 28 comprises a recess 20 at its bottom side for accommodating the occupancy detector 12. It is worthwhile noting that the recess 20 is optional if the overall height of the occupancy detector is small (e.g. below 1 cm).

At least the concave side of the flat spring 26 is made of conductive material, e.g. a metal coating. Preferably, however, the entire flat spring 26 is made of metal, such as e.g. steel. Underneath the flat spring 26, the support plate 18 carries a printed electrical circuit. The printed circuit comprises a first track 30 in permanent electrical contact with the flat spring 26 and a second track 32 spaced from the first track 30. The second track 32 is positioned such that, when the flat spring 26 bends downwardly under the action of an applied force, it ultimately contacts the second track 32 and thereby establishes an electrical contact between the first track 30 and the second track 32. The electrical shorting of the first and second tracks 30, 32 is detected by a control and evaluation circuit 42.

While the vehicle seat 10 is unoccupied (truly empty or carrying a light object, e.g. a handbag), the flat spring 26 is bend upward, and the first and second tracks 30, 32 are out of contact. As shown in FIG. 2, an occupant seated on the vehicle seat 10 causes the cushion 28 to press on the mobile plate 34 and to move it from the first position to the second position, in which it forces the flat spring 26 into contact with the second track 32. Arrow 40 indicates the increased force transferred on the suspension mat 14 due to the weight of the occupant.

A decrease of electrical resistance between the first 30 and the second track 32 thus indicates the presence of an occupant on the seat 10. The control and evaluation circuit 42 comprises an output 44 for outputting a signal indicative of whether the vehicle seat 10 is occupied or not to a vehicle's onboard computer and/or to a seat belt reminder device.

It may be noted that the first and second tracks 30, 32 need not be electrically insulated from each other while the flat spring 26 does not provide the electrical contact. Indeed, the first and second tracks 30, 32 may be connected to each other via a resistor, which is shunted in case of the vehicle seat 10 is occupied. This option has the advantage that the control and evaluation circuit 42 measures a finite resistance between the first and second tracks 30, 32 when the vehicle seat 10 is unoccupied, which allows checking circuit integrity (absence of a circuit interruption e.g. due to damage) and issuing an error message if necessary.

A vehicle seat 110 comprising a suspension mat 114 according to a second preferred embodiment of the invention is shown in FIG. 3. As in the preceding embodiment of the invention, the vehicle seat 110 comprises a structural frame (not shown), a suspension mat 114 carrying a cushion 128. The suspension mat 114 comprises an occupancy detector 112 for detecting the occupancy state ("unoccupied" or "occupied") of the vehicle seat 110.

The occupancy detector 112 comprises a support plate 118 and a mobile plate 134 in the form of a flap attached to the support plate 118 by a film hinge joint 150. The support plate comprises a generally flat middle portion 124 having a first and a second wing portion 146 laterally fixed to it. The wing portions 146 rest on one or more suspension springs 116 of the suspension mat 114. Optionally, the wing portions 146 may be fixed to the one or more suspension springs 116 by clips (not shown). Alternatively, the support plate 118 may be produced by injection molding of plastic material around the one or more suspension springs 116. The middle portion 124 is set back from the upper surface of the wing portions 146, in such a way that a recess is defined between the wing portions 146. The recess accommodates flat spring 126, preferably in the form of a metal dome. A pressure-responsive switch 154 (e.g. a membrane switch) is arranged underneath the flat spring 126 on the middle portion 124 of the support plate 118. The flat spring 126 is jammed between abutments 122 in such a way that it adopts an arcuate shape when unloaded. The flat spring 126 biases the mobile plate 134 into a first position, which is spaced from the middle portion 124 of the support plate 118.

When the seat 110 is occupied, the cushion 128 is compressed, protrudes into the recess formed between the wing portions 146 of the support plate 118 and thereby pushes the mobile plate 134 towards a second position, which is closer to the middle portion 124 of the support plate 118. While the mobile plate 134 is moved, it presses down the flat spring 126, which, in turn, gets into contact with the pressure-responsive switch 154. The pressure-responsive switch 154 is connected with a control and evaluation circuit 142, which outputs a signal 144 indicative of whether the pressure-responsive switch 154 is being actuated or not and thus of whether the vehicle seat 110 is occupied or unoccupied.

It may be noted that the mobile plate 134 and the support plate 118 may be made as one piece, e.g. an injection-molded piece of plastic.

Advantageously, the mobile plate 134 comprises a protrusion 152 facing the flat spring 126. The protrusion 152 serves to define a precise point of application of the force between the mobile plate 134 and the flat spring 126. Accordingly, the forces transferred by the mobile plate 134 from the cushion 128 onto the flat spring 126 are concentrated in one point of the flat spring 126.

FIG. 4 illustrates a vehicle seat 210 comprising a suspension mat 214 according to a third preferred embodiment of the invention. The suspension mat 214 according to the third embodiment differs from the suspension mat 114 shown in FIG. 3 only in the arrangement of one of the wing portions 246 and in the position of the film hinge joint 250. In all other respects, the suspension mat 214 of FIG. 4 is exactly the same as the suspension mat 114 of FIG. 3. What has been said above in relation with FIG. 3 thus applies also to FIG. 4.

While specific embodiments have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A vehicle seat suspension mat, comprising:
   one or more suspension springs for supporting a cushion;
   a support plate attached to at least one of said one or more suspension springs;
   a mobile plate continuously coupled with said support plate, said mobile plate being movable between a first position and a second position with respect to said support plate, wherein during translation between said first position and said second position, at least one point of direct contact is maintained between said mobile plate and said support plate;
   a flat spring arranged between said support plate and said mobile plate so as to bias said mobile plate toward said first position; and
   a switch element located between said support plate and said flat spring, in such a way that when said mobile plate moves against a bias of said flat spring toward said second position, said flat spring presses and actuates said switch element.

2. A vehicle seat suspension mat as claimed in claim 1, wherein said mobile plate is coupled to said support plate by a prismatic joint.

3. A vehicle seat suspension mat as claimed in claim 1, wherein said mobile plate is coupled to said support plate by a hinge joint.

4. A vehicle seat suspension mat as claimed in claim 3, wherein said hinge joint comprises a film hinge joint.

5. A vehicle seat suspension mat as claimed in claim 4, wherein said mobile plate and said support plate are made of one piece.

6. A vehicle seat suspension mat as claimed in claim 1, wherein said switch element comprises a printed circuit, said flat spring is conductive, said printed circuit comprises a first track in electrical contact with said flat spring, and a second track spaced from said first track and placed in such a way said first track and said second track are put in electrical contact with each other via said flat spring when said flat spring presses said switch element.

7. A vehicle seat suspension mat as claimed in claim 1, wherein said switch element comprises a pressure-responsive switch.

8. A vehicle seat suspension mat as claimed in claim 1, wherein said mobile plate comprises a protrusion facing the flat spring so as to concentrate a force exerted by said mobile plate on a point of said flat spring.

9. A vehicle seat suspension mat as claimed in claim 1, wherein said flat spring is held jammed and in tension by abutments provided on or in said support plate.

10. A vehicle seat suspension mat as claimed in claim 1, wherein said flat spring comprises at least one of a washer spring, a plate spring, a dome-shaped flat spring and a cantilever flat spring.

11. A vehicle seat, comprising:
    a suspension mat according to claim 1, wherein said suspension mat is taut;
    a cushion arranged on said suspension mat, said mobile plate being movable between an upper and a lower position in cooperation with said cushion.

12. A vehicle seat according to the claim 11, wherein said support plate is arranged in a recess of said cushion.

\* \* \* \* \*